US011108693B2

(12) United States Patent
Kurihara

(10) Patent No.: US 11,108,693 B2
(45) Date of Patent: Aug. 31, 2021

(54) CONTROL APPARATUS, COMMUNICATION CONTROL METHOD, AND PROGRAM

(71) Applicant: NEC CORPORATION, Tokyo (JP)

(72) Inventor: Kojiro Kurihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/971,811

(22) PCT Filed: Mar. 1, 2019

(86) PCT No.: PCT/JP2019/008090
§ 371 (c)(1),
(2) Date: Aug. 21, 2020

(87) PCT Pub. No.: WO2019/168153
PCT Pub. Date: Sep. 6, 2019

(65) Prior Publication Data
US 2020/0396165 A1 Dec. 17, 2020

(30) Foreign Application Priority Data
Mar. 2, 2018 (JP) .............................. JP2018-038027

(51) Int. Cl.
*H04L 12/801* (2013.01)
(52) U.S. Cl.
CPC .................................... *H04L 47/12* (2013.01)
(58) Field of Classification Search
CPC ... H04L 67/02; H04L 43/067; H04L 43/0805; H04L 67/18; H04L 41/14; H04L 43/065;
(Continued)

(56) References Cited

U.S. PATENT DOCUMENTS 6,631,115 B1 * 10/2003 Sendelbach ........... H04L 67/325
370/229
7,295,519 B2 11/2007 Sandy et al.
(Continued)

FOREIGN PATENT DOCUMENTS

EP 1489792 A1 12/2004
JP 2005-167769 A 6/2005
(Continued)

OTHER PUBLICATIONS

International search report for PCT/JP2019/008090 dated Apr. 2, 2019.
(Continued)

*Primary Examiner* — Djenane M Bayard
(74) *Attorney, Agent, or Firm* — Sughrue Mion, PLLC

(57) ABSTRACT

A control apparatus is arranged in a predetermined network and comprises: a reception part which receives communication traffic, a transmission part which executes a transmission processing transmitting the communication traffic to a destination side, a traffic analysis part which counts a number of communication sessions within predetermined time period, included in the communication traffic, and a transmission management part which holds the communication traffic and causes the transmission part to restrain execution of the transmission processing until the network becomes an off-peak state, when the number of communication sessions exceeds a predetermined session number threshold.

12 Claims, 5 Drawing Sheets

(58) Field of Classification Search
CPC ..... H04L 67/025; H04L 67/125; H04L 67/34; H04L 63/1425; H04L 67/141; H04L 43/16; H04L 63/20; H04L 12/4633; H04L 41/5009; H04L 43/0817; H04L 43/0864; H04L 29/12066; H04L 29/12207; H04L 61/1511; H04L 61/20; H04L 67/148; H04L 67/38; H04L 43/0876; H04L 43/0882; H04L 43/0888; H04L 63/10; H04L 65/80; H04L 47/24; H04L 12/4641; H04L 47/20; H04L 63/062; H04L 63/0876; H04L 63/0884; H04L 63/1416; H04L 63/1458; H04L 67/36; H04L 41/0896; H04L 43/08; H04L 47/245; H04L 47/50; H04L 47/70; H04L 47/762; H04L 47/805; H04L 63/1433; H04L 41/12; H04L 41/5067; H04L 43/04; H04L 43/0852; H04L 47/2441; H04L 47/29; H04L 65/403; H04L 67/26; H04L 67/2828; H04L 41/0823; H04L 41/5025; H04L 43/028; H04L 43/045; H04L 47/10; H04L 63/1441; H04L 63/306; H04L 65/605; H04L 67/14; H04L 69/16; H04L 69/22; H04L 12/14; H04L 12/1407; H04L 12/1432; H04L 12/4625; H04L 41/142; H04L 41/22; H04L 41/5003; H04L 41/5022; H04L 41/5032; H04L 43/026; H04L 43/0811; H04L 43/0829; H04L 43/10; H04L 43/50; H04L 45/30; H04L 47/12; H04L 47/122; H04L 47/125; H04L 47/14; H04L 47/215; H04L 47/2408; H04L 47/2416; H04L 47/2425; H04L 47/2433; H04L 47/2475; H04L 47/28; H04L 47/32; H04L 47/6215; H04L 47/6265; H04L 47/6275; H04L 63/1408; H04L 65/4084; H04L 67/10; H04L 67/142; H04L 67/143; H04L 67/146; H04L 67/303; H04L 67/306; H04L 67/322; H04L 69/14; H04L 69/28; H04L 1/1867; H04L 41/0213; H04L 47/0677; H04L 41/0816; H04L 41/0893; H04L 41/145; H04L 41/16; H04L 41/5019; H04L 41/507; H04L 41/5074; H04L 43/00; H04L 43/087; H04L 47/821; H04L 47/822; H04L 47/823; H04L 63/0227; H04L 63/0272; H04L 65/1006; H04L 65/1016; H04L 65/104; H04L 65/1046; H04L 65/1053; H04L 65/1069; H04L 65/608; H04L 67/22; H04L 67/32; H04L 69/161; H04L 69/163; G06F 21/6254; G06F 40/279; G06F 40/30; G06F 40/44; G06F 16/951; G06F 21/00; G06F 21/56; G06F 21/561; G06F 21/562; G06F 21/566; G06F 3/04842; G06F 21/6245
See application file for complete search history.

(56) References Cited

U.S. PATENT DOCUMENTS

| | | | |
|---|---|---|---|
| 7,570,635 | B2 | 8/2009 | Gotoh et al. |
| 8,537,667 | B2 | 9/2013 | Yamazaki et al. |
| 8,995,264 | B2 | 3/2015 | Yamazaki et al. |
| 9,161,261 | B2 | 10/2015 | Higashino et al. |
| 2002/0188648 | A1* | 12/2002 | Aweya ............... H04L 47/12 718/102 |
| 2004/0257995 | A1 | 12/2004 | Sandy et al. |
| 2005/0190765 | A1 | 9/2005 | Gotoh et al. |
| 2007/0019543 | A1* | 1/2007 | Wei ............... H04L 63/1408 370/229 |
| 2008/0285581 | A1* | 11/2008 | Maiorana ............ H04L 69/163 370/415 |
| 2009/0232130 | A1 | 9/2009 | Philavong |
| 2010/0098083 | A1 | 4/2010 | Yamazaki et al. |
| 2011/0055921 | A1* | 3/2011 | Narayanaswamy ........... H04L 63/1458 726/22 |
| 2013/0272125 | A1 | 10/2013 | Espina Perez et al. |
| 2013/0329735 | A1 | 12/2013 | Yamazaki et al. |
| 2014/0204756 | A1 | 7/2014 | Higashino et al. |
| 2015/0304202 | A1* | 10/2015 | Majumdar ............ H04L 69/16 709/224 |

FOREIGN PATENT DOCUMENTS

| | | |
|---|---|---|
| JP | 2005-167771 A | 6/2005 |
| JP | 2005-244904 A | 9/2005 |
| JP | 2009-219058 A | 9/2009 |
| JP | 2009-219076 A | 9/2009 |
| JP | 2010-103709 A | 5/2010 |
| JP | 2010-109575 A | 5/2010 |
| JP | 2017-212494 A | 11/2017 |
| WO | 2012085850 A1 | 6/2012 |
| WO | 2013/035416 A1 | 3/2013 |

OTHER PUBLICATIONS

Communication dated Nov. 19, 2020, from the European Patent Office in European Application No. 19760222.0.

* cited by examiner

FIG. 3

| DOMAIN OF DATA TRANSMISSION SOURCE | DISTRIBUTION DATA SIZE | SESSION NUMBER THRESHOLD |
|---|---|---|
| AAA.BBB.CCC.DDD | 500MByte | 5000 |
| EEE.FFF.GGG.HHH | 1GByte | 8000 |
| ... | ... | ... |

| TIME ZONE | EXPECTED COMMUNICATION USAGE BAND RANGE | EXPECTED UNUSED BAND RANGE | OFF-PEAK TIME ZONE FLAG |
|---|---|---|---|
| 00:00-01:00 | 1.2Gbps | 0.8Gbps | 0 |
| 01:00-02:00 | 1.0Gbps | 1.0Gbps | 1 |
| 02:00-03:00 | 500Mbps | 1.5Gbps | 1 |
| ... | ... | ... | ... |

152

CONTROL APPARATUS, COMMUNICATION CONTROL METHOD, AND PROGRAM

DESCRIPTION OF THE RELATED APPLICATION

This application is a National Stage of International Application No. PCT/JP2019/008090 filed Mar. 1, 2019, claiming priority based on Japanese Patent Application No. 2018-038027, filed Mar. 2, 2018.

FIELD

The present invention relates to a control apparatus, communication control method, and program.

BACKGROUND

In a case where an OS (Operating System) providing source releases the latest version (update) or the like, there is a case where a content server distributes data to a plurality of terminals at a same time zone. In this case, at the time zone, there is a case where communication traffic concentrates and congestion of a communication band range occurs. When the congestion of the communication band range occurs, communication delay occurs. Then, a technology to avoid the congestion of the communication band range is desired.

Patent Literature 1 describes a technology that, when congestion in a network occurs, transfer of signal from a terminal apparatus concerned with the congestion is restricted.

Patent Literature 2 describes a technology that, when a number of data distribution request messages from a domain of data distribution destination reaches a predetermined number of sessions, acceptance of a session request which occurs after that is stopped.

Patent Literature 3 describes a technology that an incoming call terminal in a session request is grouped based on an address or the like of the incoming call terminal and congestion for each group is detected. In a session technology described in Patent Literature 3, congestion restriction is performed by discarding data to the incoming terminal belonging to the group where the congestion is detected.

Patent Literature 1: Japanese Patent kokai Publication No. 2009-219058 A

Patent Literature 2: Japanese Patent kokai Publication No. 2005-244904 A

Patent Literature 3: Japanese Patent kokai Publication No. 2005-167771 A

SUMMARY

Note, disclosures of the above literatures of Citation List shall be incorporated by reference in the present description. Following analyses are made from a point of view of the present invention.

As described above, in the case where the content server distributes the data to a plurality of the terminals at the same time zone, there is a case where the congestion of the communication band range occurs. Further, when the congestion of the communication band range occurs, the communication delay occurs.

Also, when the congestion of the communication band range occurs and distribution of data is not terminated, a transmission side (the content server) or a reception side (the terminal) repeat a re-transmission processing, a re-reception processing (so called "retry") in a state where a communication band range state is unknown. As a result, when the congestion of the communication band range occurs, the re-transmission processing, the re-reception processing are repeated in spite of a state where communication is difficult.

In the technologies described in Patent Literatures 1 to 3, when the congestion of the communication band range occurs, an apparatus relaying communication discards data concerned with the congestion. Therefore, in the technology described in Patent Literatures 1 to 3, when the congestion is eliminated, it is necessary for a transmission source of data to re-transmit a signal. Thus, in the technologies described in Patent Literatures 1 to 3, it is necessary that the transmission source of data re-executes a same transmission processing to complete the transmission processing of data.

Accordingly, it is an object of the present invention to provide a control apparatus, communication control method, and program that contribute to secure a communication channel stably while suppressing increase of processing load in a data transmission source.

According to a first aspect, a control apparatus is provided. The control apparatus is arranged in a network. The control apparatus comprises a reception part which receives communication traffic. Further, the control apparatus comprises a transmission part which executes a transmission processing transmitting the communication traffic to a destination side. Further, the control apparatus comprises a traffic analysis part which counts a number of communication sessions within a predetermined time period, included in the communication traffic. Further, the control apparatus comprises a transmission management part which holds the communication traffic and causes the transmission part to restrain execution of the transmission processing, until a network becomes an off-peak state, when the number of communication sessions exceeds a predetermined session number threshold.

According to a second aspect, a communication control method is provided. The communication control method includes receiving communication traffic in a predetermined network. Further, the communication control method includes counting a number of communication sessions within a predetermined time period, included in the communication traffic. Further, the communication control method includes holding the communication traffic and restraining a process of transmitting the communication traffic to a destination side, until the network becomes an off-peak state, when the number of communication sessions exceeds a predetermined session number threshold.

In addition, the method is coupled with a specified machine which is a control apparatus relaying communication traffic arranged in a predetermined network.

According to a third aspect, a program is provided. The program causes a computer controlling a control apparatus to execute a process of receiving communication traffic in a predetermined network. Further, the program causes the computer to execute a process of counting a number of communication sessions within a predetermined time period, included in the communication traffic. Further, the program causes the computer to execute a process of holding the communication traffic and restraining a process of transmitting the communication traffic to a destination side, until the network becomes an off-peak state, when the number of communication sessions exceeds a predetermined session number threshold.

In addition, the program can be recorded in a computer readable storage medium. The storage medium can be a non-transient medium such as a semiconductor memory, hard disk, magnetic recording medium, optical recording medium, and other medium. The present invention can also be embodied as a computer program product.

According to each aspect, there are provided a control apparatus, communication control method, and program that contribute to secure a communication channel stably while suppressing increase of processing load in a data transmission source.

BRIEF DESCRIPTION OF THE DRAWINGS

FIG. 3 is a diagram illustrating an example of a communication management DB 151.

FIG. 4 is a diagram illustrating an example of a traffic management DB 152.

PREFERRED MODES

Figure 1:
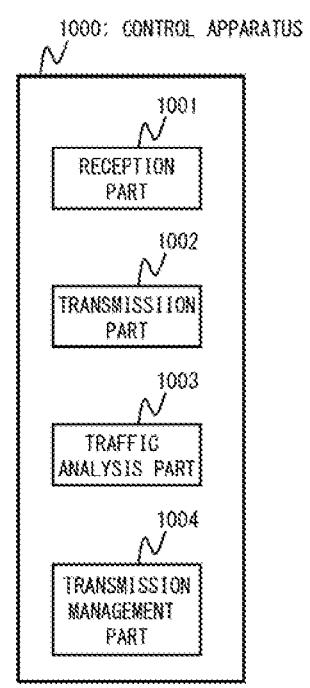
FIG. 1 is a diagram for explaining an overview of an exemplary embodiment.

Firstly, an overview of an exemplary embodiment will be explained by using FIG. 1. In addition, drawing reference numerals added to the overview are numerals added to each element as an example for convenience to help the understanding, and the description of the overview is not intended to give any limitation. Further, a connection line between blocks in each block diagram includes both bidirectional and unidirectional. One-way arrow indicates schematically flow of primary signal (data), and does not exclude bidirectionality. In addition, in a circuit diagram, block diagram, internal configuration diagram, connection diagram or the like, though explicit description is omitted, an input port and output port exist at an input end and output end of each connection line, respectively. The same applies to an input and output interface, too.

As mentioned above, a control apparatus is desired that contributes to ensure a communication channel stably while suppressing increase of processing load in data transmission source.

Therefore, as an example, a control apparatus 1000 illustrated in FIG. 1 is provided. The control apparatus 1000 comprises a reception part 1001, transmission part 1002, traffic analysis part 1003, and transmission management part 1004.

The control apparatus 1000 is arranged in a predetermined network. For example, the control apparatus 1000 is arranged in a core network.

The reception part 1001 receives communication traffic. The transmission part 1002 transmits the communication traffic received by the reception part 1001 to a destination side. The traffic analysis part 1003 counts a number of communication sessions within a predetermined time period, included in the communication traffic received by the reception part 1001. When the number of communication sessions exceeds a predetermined session number threshold, the transmission management part 1004 holds (saves) the communication traffic and causes the transmission part 1002 to restrain execution of a transmission processing, until the network becomes an off-peak state. Here, the off-peak state is a state that congestion of a communication band range does not occur and means a communication-available state satisfying a predetermined communication quality.

That is, when the network is not in the off-peak state, the control apparatus 1000 holds (saves) the communication traffic of the number of sessions exceeding the predetermined threshold in the control apparatus 1000. And, when the network is in the off-peak state, the control apparatus 1000 transmits (transfers) the held (saved) communication traffic to the destination side. Therefore, even if a transmission source of data distributes a large amount of data simultaneously, it is possible to avoid occurrence of the congestion of the communication band range by controlling a transmission timing of data in the control apparatus 1000. Further, when the control apparatus 1000 restrains the transmission processing of data, the control apparatus 1000 holds the data until transmitting the data. Therefore, the control apparatus 1000 does not request re-transmission of the same data to the transmission source of the data. Accordingly, the control apparatus 1000 contributes to secure a communication channel stably while suppressing increase of processing load in the data transmission source.

First Exemplary Embodiment

It will be explained about a first exemplary embodiment by using figures in detail. In addition, in the following description, when communication sessions which correspond to a same data transmission source and exceed a predetermined threshold has occurred within a predetermined time period, it is expressed that "simultaneous mass communication" has occurred.

Figure 2:
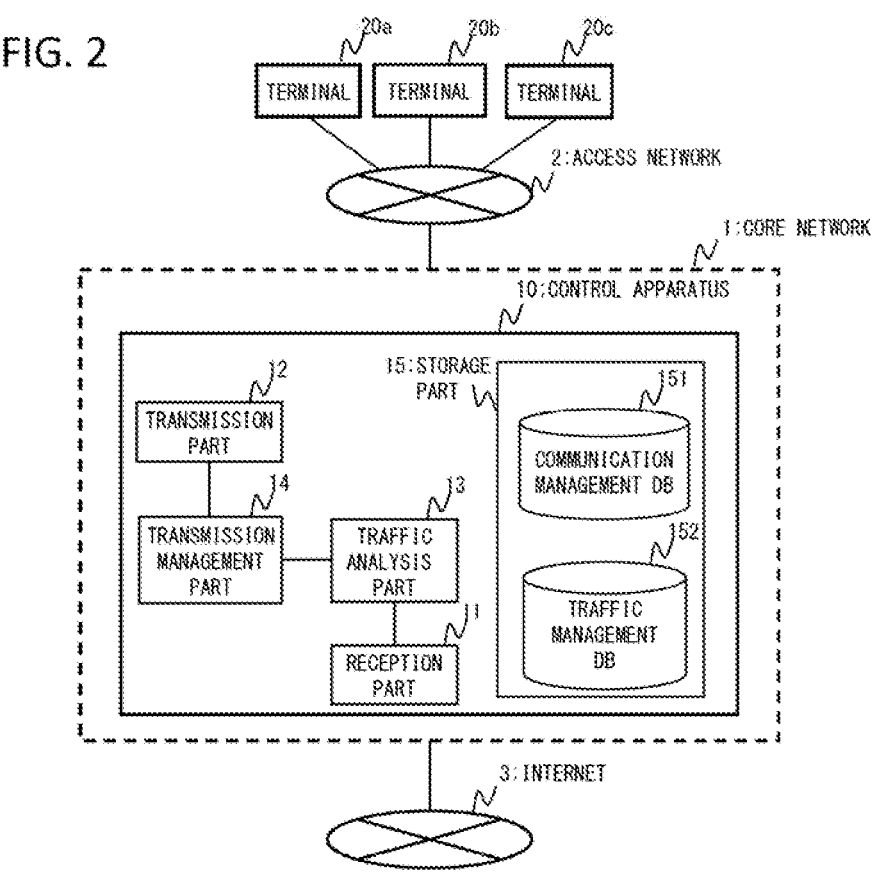
FIG. 2 is a block diagram illustrating an example of overall structure of a communication system.
Figure 5:
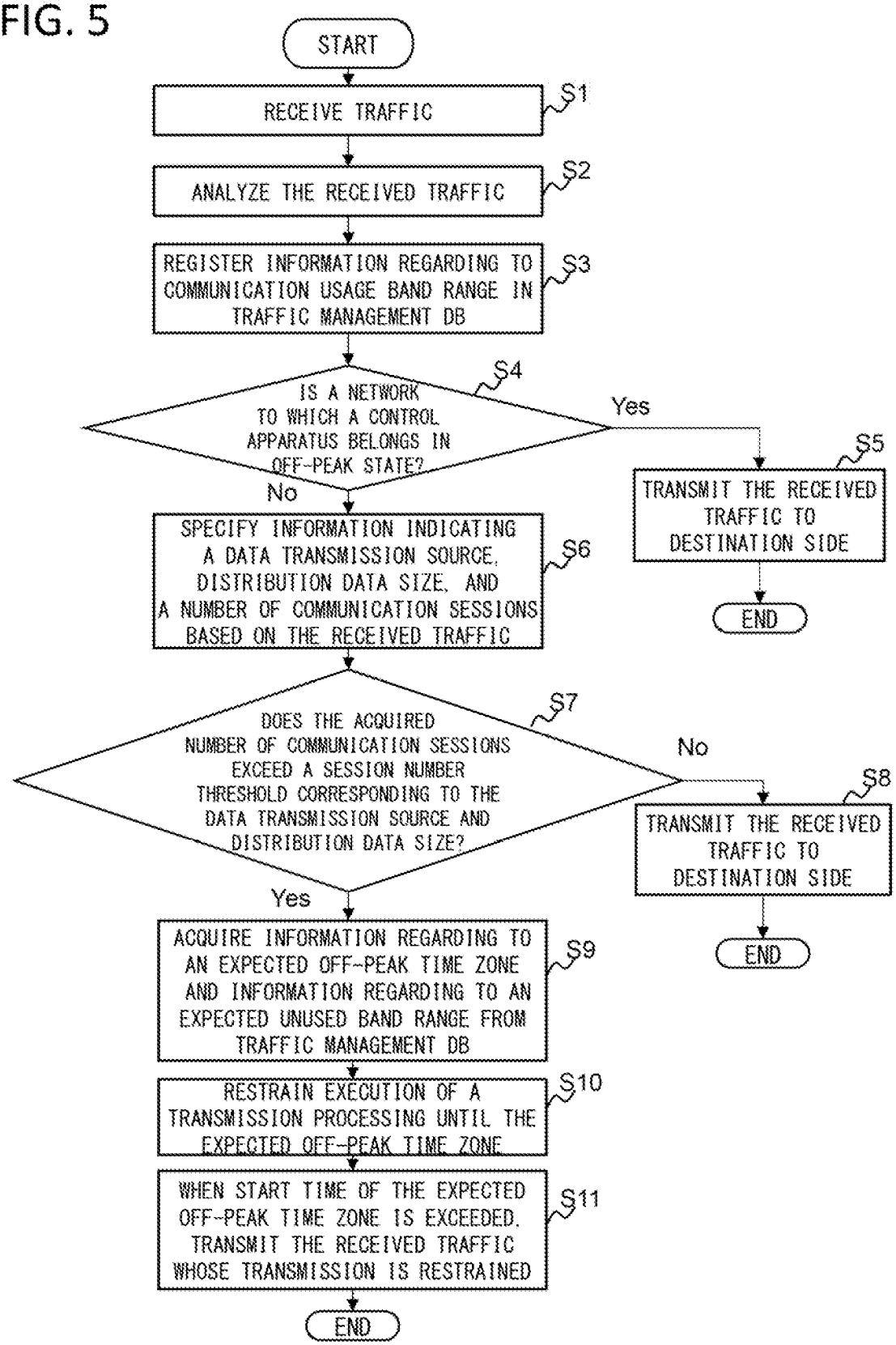
FIG. 5 is a flowchart illustrating an example of an operation of a control apparatus 10.

FIG. 2 is a block diagram illustrating an example of overall structure of a communication system according to the present exemplary embodiment.

A control apparatus 10 is arranged in a predetermined network. In the communication system according to the present exemplary embodiment, the control apparatus 10 is arranged in a core network 1. In the following description, a case where the control apparatus 10 receives data destined to a plurality of terminals (20a, 20b, 20c) from a content server of an internet 3 side will be described as an example. However, this does not mean that the control apparatus 10 according to the present exemplary embodiment is limited to an apparatus receiving the data destined to the plurality of terminals (20a, 20b, 20c) from the content server of the internet 3 side.

A terminal 20 connects to the core network 1 via an access network 2.

The control apparatus 10 is configured by including a reception part 11, transmission part 12, traffic analysis part 13, transmission management part 14, and storage part 15. The storage part 15 stores a communication management DB (Database) 151 and traffic management DB 152.

Each module of the control apparatus 10 may be realized by a computer program which causes a computer installed in the control apparatus 10 to execute an operation of the control apparatus 10 by using its hardware.

The storage part 15 stores information indicating a data transmission source and a session number threshold in association with each other, with respect to a network to which the control apparatus 10 belongs. Concretely, the communication management DB 151 stores the information indicating the data transmission source and the session number threshold in association with each other. Or the communication management DB 151 may store the information indicating the data transmission source, total data size scheduled to be transmitted by the data transmission source, and the session number threshold in association with each other. In the following description, the total data size scheduled to be transmitted is called "distribution data size".

FIG. 3 is a diagram illustrating an example of the communication management DB 151. The communication management DB 151 illustrated in FIG. 3 stores a domain of the data transmission source, the distribution data size, and the session number threshold in association with each other. For example, FIG. 3 illustrates that, when a content server corresponding the domain of the data transmission source "AAA.BBB.CCC.DDD" distributes data of "500" MByte, an upper limit of a number of sessions within a predetermined time is "5000".

Further, the storage part 15 stores information indicating an expected off-peak time zone and information regarding to a communication usage band range in association with each other, with respect to the network to which the control apparatus belongs. Concretely, the traffic management DB 152 stores the information indicating the expected off-peak time zone and the information regarding to the communication usage band range in association with each other, with respect to the network to which the control apparatus 10 belongs. Here, the expected off-peak time zone means a time zone expected to which the network to which the control apparatus 10 belongs is in an off-peak state.

Or the traffic management DB 152 may store the information indicating the expected off-peak time zone, an expected communication usage band range, an expected unused band range, and information indicating whether or not being in the off-peak state, in association with each other. Here, the expected communication usage band range means a band range expected to be used. In addition, the expected unused band range means a band range expected not to be used for the communication. In addition, in the following description, the information indicating whether or not being in the off-peak state is called an "off-peak time zone flag".

FIG. 4 is a diagram illustrating an example of the traffic management DB 152. The traffic management DB 152 stores a time zone, the expected communication usage band range, the expected unused band range, and the off-peak time zone flag in association with each other. Here, in FIG. 4, it is assumed that the off-peak time zone flag="0" indicates that the network is not in the off-peak state. On the other hand, in FIG. 4, it is assumed that the off-peak time zone flag="1" indicates that the network is in the off-peak state. In this case, FIG. 4 illustrates that, from 0:00 to less than 1:00 (that is, time zone "00:00-01:00"), the network is not in the off-peak state. Further, FIG. 4 illustrates that, from 0:00 to less than 1:00, the expected communication usage band range is "1.2" Gbps and the expected unused band range is "0.8" Gbps. In addition, FIG. 4 illustrates that, from 1:00 to less than 2:00 (that is, time zone "01:00-02:00"), the network is in the off-peak state. Further, FIG. 4 illustrates that, from 1:00 to less than 2:00, the expected communication usage band range is "1.0" Gbps and the expected unused band range is "1.0" Gbps.

The reception part 11 receives communication traffic. For example, the reception part 11 receives the communication traffic including data destined to the plurality of terminals (20a, 20b, 20c) from the content server of the internet 3 side. Also, in the following description, the terminals (20a, 20b, 20c) are referred to as a "terminal 20" as far as it is not necessary to distinguish from one to another. In addition, in FIG. 2, three terminals (20a, 20b, 20c) are described, but this does not mean that a destination of data is limited to three terminals. It is evident that the reception part 11 may receive the communication traffic including data destined to one, two, or four or more terminals 20.

The transmission part 12 executes a processing of transmitting the communication traffic received by the reception part 11 to a destination side (that is, the terminal 20 side) (hereinafter referred as "transmission processing"). In the following description, the communication traffic received by the reception part 11 is called a "received communication traffic.

The traffic analysis part 13 analyzes (measures) the received communication traffic. Concretely, the traffic analysis part 13 specifies the communication usage band range based on the received communication traffic.

In addition, the traffic analysis part 13 calculates a statistic value (for example, average value) of the communication usage band range for each time zone (for example, each one hour). For example, the traffic analysis part 13 may calculate the statistic value (for example, average value) during a predetermined period (for example, one month) with respect to the communication usage band range for each time zone (for example, each one hour).

The traffic analysis part 13 determines whether or not the network tends to be in the off-peak sate in a predetermined time zone based on the statistic value of the communication usage band range corresponding to the time zone. For example, the traffic analysis part 13 may determine that the network tends to be in the off-peak state when the statistic value of the communication usage band range corresponding to the predetermined time zone is less than or equal to a predetermined threshold. On the other hand, the traffic analysis part 13 may determine that the network tends not to be in the off-peak state when the statistic value of the communication usage band range corresponding to the predetermined time zone exceeds the predetermined threshold.

And, it is assumed that the traffic analysis part 13 determines that the network tends to be in the off-peak state in a corresponding time zone. In this case, the traffic analysis part 13 registers, in the traffic management DB 152, the time zone and information indicating that the network is in the off-peak state (for example, the off-peak time zone flag="1") in association with each other.

On the other hand, it is assumed that the traffic analysis part 13 determines that the network tends not to be in the off-peak state in the corresponding time zone. In this case, the traffic analysis part 13 registers, in the traffic management DB 152, the time zone and information indicating that the network is not in the off-peak state (for example, the off-peak time zone flag="0") in association with each other.

Further, the traffic analysis part 13 registers the statistic value of the communication usage band range in the traffic management DB 152. Concretely, the traffic analysis part 13 registers the statistic value of the communication usage band range as the expected communication usage band range with respect to a time zone when the reception part 11 receives the received communication traffic. Further, the traffic analysis part 13 updates the expected unused band range registered in the traffic management DB 152 based on the expected communication usage band range, with respect to the time zone when the reception part 11 receives the received communication traffic.

Further, the traffic analysis part 13 specifies information indicating the data transmission source and a total data size scheduled to be transmitted based on the received communication traffic. Further, the traffic analysis part 13 counts a number of communication sessions within a predetermined time period, included in the received communication traffic. For example, the traffic analysis part 13 may count the number of communication sessions, within the predetermined time period for each domain of the data transmission source.

And, the traffic analysis part 13 generates communication information indicating the data transmission source corresponding to the received communication traffic, the total data size scheduled to be transmitted by the data transmission source, and the number of communication sessions within the predetermined time period in association with each other.

Further, the traffic analysis part 13 determines whether or not the network to which the control apparatus 10 belongs is in the off-peak state. As mentioned above, the off-peak state means a state that congestion of a communication band range does not occur and a communication available state satisfying a predetermined communication quality. Also, in the following description, it is assumed that the network to which the control apparatus 10 belongs is the core network 1.

Concretely, the traffic analysis part 13 acquires the session number threshold corresponding to the data transmission source from the storage part 15. More concretely, the traffic analysis part 13 acquires the session number threshold corresponding to the data transmission source included in the generated communication information. And, the traffic analysis part 13 determines whether or not the number of communication sessions within the predetermined time period exceeds the session number threshold corresponding to the same data transmission source for each data transmission source included in the generated communication information.

When the data transmission source for which the number of communication sessions exceeds the session number threshold is included in the generated communication information, the traffic analysis part 13 determines that the network to which the control apparatus 10 belongs is not in the off-peak state. In other words, when the data transmission source for which the number of communication sessions exceeds the session number threshold is included in the generated communication information, the traffic analysis part 13 determines that the simultaneous mass communication has occurred.

On the other hand, when the data transmission source for which the number of communication sessions exceeds the session number threshold is not included in the generated communication information, the traffic analysis part 13 determines that the network to which the control apparatus 10 belongs is in the off-peak state.

And, when the number of communication sessions exceeds the session number threshold, the transmission management part 14 holds (saves) the received communication traffic until the network to which the control apparatus 10 belongs becomes the off-peak state. Further, when the number of communication sessions exceeds the session number threshold, the transmission management part 14 causes the transmission part 12 to restrain execution of the transmission processing until the network to which the control apparatus 10 belongs becomes the off-peak state.

Alternatively, when the number of communication sessions exceeds the session number threshold, the transmission management part 14 holds the received communication traffic until the traffic analysis part 13 determines that the network to which the control apparatus 10 belongs is in the off-peak state. Further, when the number of communication sessions exceeds the session number threshold, the transmission management part 14 causes the transmission part 12 to restrain execution of the transmission processing until the traffic analysis part 13 determines that the network to which the control apparatus 10 belongs is in the off-peak state.

In other words, when the traffic analysis part 13 determines that the simultaneous mass communication has occurred, the transmission management part 14 holds the received communication traffic and causes the transmission part 12 to restrain execution of the transmission processing, until the network to which the control apparatus 10 belongs becomes the off-peak state.

Further, after the traffic analysis part 13 determines that the simultaneous mass communication has occurred, when start time of the expected off-peak time zone registered in the traffic management DB 152 is exceeded (i.e., has elapsed), the traffic analysis part 13 determines that the network to which the control apparatus 10 belongs is in the off-peak state.

In this case, when the number of communication sessions exceeds the session number threshold, the transmission management part 14 holds the received communication traffic and causes the transmission part 12 to restrain execution of the transmission processing, until the start time of the expected off-peak time zone. In other words, when the traffic analysis part 13 determines that the simultaneous mass communication has occurred, the transmission management part 14 holds the received communication traffic and causes the transmission part 12 to restrain execution of the transmission processing, until the start time of the expected off-peak time zone registered in the traffic management DB 152 is exceeded Next, it will be described in detail about operation of the control apparatus 10 according to the present exemplary embodiment. Further, in the following description, it will be described by exemplifying a case where the communication management DB 151 stores the information illustrated in FIG. 3. In addition, it will be described by exemplifying a case where the traffic management DB 152 stores the information illustrated in FIG. 4. And, it is assumed that the content server arranged on the internet 3 side and whose domain is "AAA.BBB.CCC.DDD" performs simultaneous data distribution of "500" MByte to the terminals 20 whose number of the terminals 20 is "10000" at 23:00.

In Step S1, the reception part 11 receives communication traffic. Concretely, when the communication traffic transmitted from the content server of data transmission source passes through the control apparatus 10 in the core network 1, the reception part 11 receives the communication traffic. For example, the reception part 11 receives the communication traffic which is data of "500" MByte transmitted from the content server of domain "AAA.BBB.CCC.DDD" and whose number of sessions is "10000".

In Step S2, the traffic analysis part 13 analyzes the communication traffic (received communication traffic) received by the reception part 11.

In Step S3, the traffic analysis part 13 registers a communication usage band range corresponding to the received communication traffic in the traffic management DB 152. The traffic analysis part 13 updates the communication usage band range and an expected unused band range registered in the traffic management DB 152 based on the communication usage band range corresponding to the received communication traffic, with respect to a time zone at the time the reception part 11 received the received communication traffic.

In Step S4, the traffic analysis part 13 determines whether or not a network to which the control apparatus 10 belongs is in an off-peak state. When the network to which the control apparatus 10 belongs is in the off-peak state (Yes branch in Step S4), the control apparatus 10 transmits the received communication traffic to a destination side (Step S5). Concretely, when the network to which the control apparatus 10 belongs is in the off-peak state, the transmission management part 14 causes the transmission part 12 to execute a process of transmitting the received communication traffic to the destination side. That is, when the control apparatus 10 receives the received communication traffic, the control apparatus 10 transfers the received communication traffic to the destination side sequentially without holding the received communication traffic.

On the other hand, when the network to which the control apparatus 10 belongs is not in the off-peak state (No branch in Step S4), the traffic analysis part 13 specifies information indicating the data transmission source, a distribution data size, and a number of communication sessions based on the received communication traffic (Step S6).

In Step S7, the traffic analysis part 13 determines whether or not the acquired number of communication sessions exceeds a session number threshold corresponding to the data transmission source and distribution data size. When the acquired number of communication sessions does not exceed the session number threshold corresponding to the data transmission source and distribution data size (No branch in Step S7), the control apparatus 10 transmits the received communication traffic to the destination side (Step S8). Concretely, when the acquired number of communication sessions does not exceed the session number threshold corresponding to the data transmission source and distribution data size, the transmission management part 14 causes the transmission part 12 to execute the process of transmitting the received communication traffic to the destination side. That is, when the control apparatus 10 receives the received communication traffic, the control apparatus 10 transfers the received communication traffic to the destination side sequentially without holding the received communication traffic.

On the other hand, when the acquired number of communication sessions exceed the session number threshold corresponding to the data transmission source and distribution data size (Yes branch in Step S7), the process shifts to Step S9.

For example, it is assumed that the traffic analysis part 13 specifies that the domain of the data transmission source (the information indicating the data transmission source) is "AAA.BBB.CCC.DDD" based on the received communication traffic. In addition, it is assumed that the traffic analysis part 13 specifies that the distribution data size is "500" MByte based on the received communication traffic. Further, it is assumed that the traffic analysis part 13 specifies that the number of communication sessions "10000" based on the received communication traffic. And, as mentioned above, it is assumed that the communication management DB 151 stores the information illustrated in FIG. 3. In this case, the traffic analysis part 13 determines that the acquired number of communication sessions (That is, "10000") exceeds the session number threshold (That is, "5000"). Therefore, the control apparatus 10 shifts to a process of Step S9.

In Step S9, the transmission management part 14 acquires information regarding to an expected off-peak time zone and information regarding an expected unused band range from the traffic management DB 152.

In Step S10, the transmission management part 14 holds execution of a transmission processing until the expected off-peak time zone. Concretely, the transmission management part 14 holds the communication traffic and causes the transmission part 12 to restrain the execution of the transmission processing, until the expected off-peak time zone. And, when a start time of the expected off-peak time zone is exceeded, the control apparatus 10 transmits, to the destination side, the received communication traffic whose transmission has been restrained (Step S11). Concretely, when the start time of the expected off-peak time zone is exceeded, the transmission management part 14 causes the transmission part 12 to execute the process of transmitting, to the destination side, the received communication traffic whose transmission has been restrained.

For example, as mentioned above, it is assumed that the traffic management DB 152 stores the information illustrated in FIG. 4. And, it is assumed that the content server being domain "AAA.BBB.CCC.DDD" performs simultaneous data distribution of "500" MByte to the terminals 20 whose number of the terminals 20 is "10000" at 23:00. In this case, the transmission management part 14 determines that the network is not in the off-peak state at a time zone after start of data distribution and from 0:00 to less than 1:00 based on the traffic management DB 152 illustrated in FIG. 4. However, the transmission management part 14 determines that the network is in the off-peak state at the time zone after the start of the data distribution and from 1:00 to less than 2:00 based on the traffic management DB 152 illustrated in FIG. 4. That is, the transmission management part 14 specifies the time zone after the start of data distribution and the time zone from 1:00 to less than 2:00 as the expected off-peak time zone.

In this case, the transmission management part 14 holds the received communication traffic and causes the transmission part 12 to restrain the execution of the transmission processing, until 1:00. And, the transmission management part 14 causes the transmission part 12 to execute the process of transmitting, to the destination side, the received communication traffic whose transmission has been restrained after 1:00. Thereby, it is possible that the control apparatus 10 avoids congestion of a communication band range and transmits the data of "500" MByte transmitted from the content server of domain "AAA.BBB.CCC.DDD" to the terminals 20 whose number of the terminals 20 is "10000".

As mentioned above, the control apparatus according to the present exemplary embodiment determines whether or not there is the simultaneous mass communication based on the number of communication sessions within the predetermined time period. And, when the simultaneous mass communication has occurred, the control apparatus 10 according to the present exemplary embodiment holds the communication traffic corresponding to the simultaneous mass communication until the predetermined expected off-peak time zone, and when the start time of the expected off-peak time zone is exceeded, the control apparatus 10 according to the present exemplary embodiment transmits the data corresponding to the communication traffic to the destination side. Thereby, the control apparatus according to the present exemplary embodiment contributes to avoid the congestion of the communication band range. Further, the control apparatus 10 according to the present exemplary embodiment does not request re-transmission of the same data to the data transmission source since the control apparatus 10 according to the present exemplary embodiment holds received traffic. Accordingly, the control apparatus 10 according to the present exemplary embodiment contributes to secure a communication channel stably while suppressing increase of processing load in the data transmission source.

Further, when the simultaneous mass communication has occurred, the control apparatus 10 according to the present exemplary embodiment controls a transmission timing of data by transferring the data to the destination side at the expected off-peak time zone. Thereby, when the simultaneous mass communication occurs at a time zone when communication concentrates (so called "peak hour"), the control apparatus 10 according to the present exemplary embodiment contributes to suppress concentration of the communication.

Further, there is a case where a MVNO (Mobile Virtual Network Operator) carrier raises (or increases) a contract band range for a MNO (Mobile Network Operator) to avoid congestion of communication band range. As a result, the MVNO carrier needs to increase a cost to avoid the congestion of the communication band range. However, the control apparatus 10 according to the present exemplary embodiment avoids the congestion of the communication band range by transmitting the data to the destination side at the expected off-peak time zone. Therefore, the control apparatus 10 according to the present exemplary embodiment contributes to make the MVNO carrier reduce the cost.

Further, when the congestion of the communication band range has occurred and data distribution does not be completed, a transmission side (the content server) or a reception side (the terminal) repeats a re-transmission processing, or a re-reception processing (so called "retry"). When the transmission side or reception side repeats the retry, the communication band range (unused band range) is wastefully consumed. However, the control apparatus 10 according to the present exemplary embodiment controls the transmission timing of the data by holding the received traffic and transferring the data to the destination side at the expected off-peak time zone. Therefore, the control apparatus 10 according to the present exemplary embodiment avoids to repeat the retry in the transmission side (the content server) or reception side (the terminal). As a result, the control apparatus 10 according to the present exemplary embodiment contributes to suppress wasteful consumption of the communication band range (the unused band range).

Second Exemplary Embodiment

Next, it will be described about a second exemplary embodiment by using figures in detail.

The present exemplary embodiment is an exemplary embodiment that, when an expected unused band range is used beyond a predetermined size at an expected off-peak time zone, a transmission processing is interrupted and restarted at a next expected off-peak time zone. In addition, description of overlapped part with above exemplary embodiment is omitted in the description of the present exemplary embodiment. Further, a same component as the above exemplary embodiment is given at the same reference sign and the description is omitted. Further, description regarding to a same effect as the above exemplary embodiment is omitted in the description of the present exemplary embodiment, too.

An overall structure of a communication system according the present exemplary embodiment is illustrated in FIG. 2.

A transmission management part 14 according to the present exemplary embodiment causes a transmission part 12 to execute a transmission processing at an expected off-peak time zone, and estimates an expected unused time zone based on the expected off-peak time zone and information regarding to a communication usage band range.

And, when the expected unused band range exceeds a predetermined size at the expected off-peak time zone, the transmission management part 14 according to the present exemplary embodiment causes the transmission part 12 to interrupt the transmission processing and restart the transmission processing at the next expected off-peak time zone.

That is, even if the transmission processing is started at the expected off-peak time zone, when the unused band range decreases, a control apparatus 10 according to the present exemplary embodiment interrupts the transmission processing until the next expected off-peak time zone. Therefore, the control apparatus 10 according to the present exemplary embodiment contributes to secure a communication channel stably still more while suppressing increase of processing load in a data transmission source.

In the above description, it is described about an exemplary embodiment that the control apparatus 10 is arranged in a core network 1. However, this does not mean that the control apparatus 10 is limited to a configuration arranged in the core network 1. It is evident that the control apparatus 10 may be arranged in a network other than the core network.

Further, in the above description, it is described about an exemplary embodiment that the control apparatus 10 receives a communication traffic destined to a plurality of terminals 20 from an internet 3 side. However, this does not mean that the control apparatus 10 is limited to an exemplary embodiment receiving the communication traffic destined to the plurality of terminals 20 from the internet 3 side. It is evident that the control apparatus 10 may receive the communication traffic to the internet 3 side from the terminal 20. In this case, it is evident that the traffic analysis part 13 may determine whether or not there is simultaneous mass communication based on the communication traffic to the internet 3 side from the terminal 20. When the control apparatus 10 detects the simultaneous mass communication to the internet 3 side from the terminal 20, the control apparatus 10 may determine that an illegal access has occurred. In this case, the control apparatus 10 may disconnect communication corresponding to the detected simultaneous mass communication. Thereby, the control apparatus 10 contributes to improve security for the network.

Further, in the above description, it is described about an exemplary embodiment that the control apparatus 10 is configured by including a communication management DB 151 and traffic management DB 152. However, it is evident that an information processing apparatus different from the control apparatus 10 (a computer, not illustrated) may store the communication management DB 151 and traffic management DB 152. Further, it is evident that the communication management DB 151 and traffic management DB 152 may be stored in the respective different information processing apparatuses (computers, not shown).

Further, in the above description, it is described about an exemplary embodiment that a traffic analysis part 13 counts a number of communication sessions for each domain of a data transmission source. However, it is evident that the traffic analysis part 13 may count the number of communication sessions for each address of the transmission source. For example, the traffic analysis part 13 may count the number of communication sessions for each IP (Internet Protocol) address of the data transmission source. Further, the traffic analysis part 13 may count the number of communication sessions for MAC (Media Access Control) address of the data transmission source.

Further, in the above description, it is described about an exemplary embodiment that the traffic analysis part 13 determines whether or not a network tends to be in an off-peak state in a predetermined time zone based on a statistic value of a communication usage band range corresponding to the predetermined time zone. However, it is evident that the traffic analysis part 13 may determine whether or not the network tends to be in the off-peak state based on the statistic value of an unused band range corresponding to the predetermined time zone.

Further, in the above description, it is described about an exemplary embodiment that the traffic analysis part 13 analyzes received traffic and registers the expected off-peak time zone in the traffic management DB 152. However, it is evident that a manager or the like of the control apparatus 10 may input the expected off-peak time zone in the control apparatus 10. That is, it is evident that the control apparatus 10 may register the expected off-peak time zone in the traffic management DB 152 based on operation of the manager or the like of the control apparatus 10.

Further, in the above description, it is described about an exemplary embodiment that the traffic management DB 152 manages the expected off-peak time zone by unit of an hour. However, this does not mean that the traffic management DB 152 is limited to manage the expected off-peak time zone by unit of an hour. It is evident that the traffic management DB 152 may manage the expected off-peak time zone by unit of an arbitrary time period.

A part or all of the above exemplary embodiments can be described as in a following mode(s), but is not limited to the followings.

(Mode 1) It is as the control apparatus according to the first aspect.

(Mode 2) The control apparatus preferably according to Mode 1, wherein the traffic analysis part counts the number of communication sessions for each data transmission source.

(Mode 3) The control apparatus preferably according to Mode 1 or 2, wherein the traffic analysis part counts the number of communication sessions for each domain of a data transmission source.

(Mode 4) The control apparatus preferably according to any one of Modes 1 to 3, wherein the traffic analysis part determines whether or not the network is in an off-peak state, and when the number of communication sessions exceeds the session number threshold, the transmission management part holds the communication traffic and causes the transmission part to restrain execution of the transmission processing, until the traffic analysis part determines that the network becomes the off-peak state (Mode 5) The control apparatus preferably according to any one of Modes 1 to 4, further comprising a storage part which stores information indicating a data transmission source and the session number threshold in association with each other, wherein the traffic analysis part acquires the session number threshold corresponding to the data transmission source from the storage part, and when the number of communication sessions exceeds the acquired session number threshold, the transmission management part holds the communication traffic and causes the transmission part to restrain execution of the transmission processing, until the network becomes an off-peak state.

(Mode 6) The control apparatus preferably according to Mode 5, wherein the storage part stores information indicating an expected off-peak time zone, the traffic analysis part determines that the network is in an off-peak state when start time of the expected off-peak time zone is exceeded, and when the number of communication sessions exceeds the session number threshold, the transmission management part holds the communication traffic and causes the transmission part to restrain execution of the transmission processing, until the start time of the expected off-peak time zone is exceeded.

(Mode 7) The control apparatus preferably according to Mode 6, wherein the storage part stores information indicating the expected off-peak time zone and information regarding to a communication usage band range in association with each other, and the transmission management part causes the transmission part to execute the transmission processing at the expected off-peak time zone, estimates an expected unused band range based on the expected off-peak time zone and the information regarding the communication usage band range, causes the transmission part to interrupt the transmission processing when the expected unused band range is used by exceeding a predetermined size at the expected off-peak time zone, and causes the transmission part to restart execution of the transmission processing at a next expected off-peak time zone.

(Mode 8) It is as the communication control method according to the second aspect.

(Mode 9) It is as the program according to the third aspect.

Further, it is possible that a mode indicating the Modes 8, 9 is expanded to a mode indicating the Modes 2 to 7 in the same way as a mode indicating Mode 1.

Further, it is assumed that the above patent literatures are incorporated by reference in the present application. Within entire disclosure of the present invention (including claims), and based on the basic technical concept, it is possible to change and adjust the exemplary embodiments. Also, various combinations or selections (including partial removal) of different disclosed elements (including each element of each claim, each element of each exemplary embodiment, each element of each figure, or the like) within the entire disclosure of the present invention are possible. That is, in the present invention, it is to include various variations or modifications that could be made by a person skilled in the art according to the entire disclosure including claims and the technical concept. Especially, even if there is no explicit description with respect to any number or a small range included in a numerical range described in the present application, it should be interpreted as concretely described about the numerical range described in the present application. When algorithm, software, a flowchart, or an automated process step is showed in the present invention, it is evident that a computer is used, and it is evident that the processor and memory, or the storage apparatus is installed in the computer. Accordingly, even if there is no explicit description, it is understood that these elements are described in the present application of course.

SIGN LIST

1 core network
2 access network
3 internet
10, 100 control apparatus
11, 1001 reception part
12, 1002 transmission part
13, 1003 traffic analysis part
14, 1004 transmission management part
15 storage part
20, 20a-20c terminal
151 communication management DB
152 traffic management DB

The invention claimed is:

1. A control apparatus arranged in a predetermined network, the apparatus comprising:

at least a processor; and a memory in circuit communication with the processor, wherein the processor is configured to execute program instructions stored in the memory to implement:

a reception part which receives communication traffic;

a transmission part which executes a transmission processing transmitting the communication traffic to a destination side;

a traffic analysis part which counts a number of communication sessions within a predetermined time period, included in the communication traffic;

a transmission management part which holds the communication traffic and causes the transmission part to restrain execution of the transmission processing until the network becomes an off-peak state, when the number of communication sessions exceeds a predetermined session number threshold; and a storage part which stores information indicating a data transmission source and the session number threshold in association with each other, wherein:

the traffic analysis part acquires the session number threshold corresponding to the data transmission source from the storage part, the transmission management part holds the communication traffic and causes the transmission part to restrain execution of the transmission processing until the network becomes the off-peak state, when the number of communication sessions exceeds the acquired session number threshold, the storage part stores information indicating an expected off-peak time zone, the traffic analysis part determines that the network is in the off-peak state when start time of the expected off-peak time zone is exceeded, the transmission management part holds the communication traffic and causes the transmission part to restrain execution of the transmission processing until the start time of the expected off-peak time zone is exceeded, when the number of communication sessions exceeds the session number threshold, the storage part stores information indicating the expected off-peak time zone and information regarding to a communication usage band range in association with each other, and the transmission management part causes the transmission part to execute the transmission processing at the expected off-peak time zone, estimates an expected unused time zone based on the expected off-peak time zone and the information regarding the communication usage band range, causes the transmission part to interrupt the transmission processing when the expected unused band range is used by exceeding a predetermined size at the expected off-peak time zone, and cause the transmission part to restart execution of the transmission processing at a next expected off-peak time zone.

2. The control apparatus according to claim 1, wherein the traffic analysis part counts the number of communication sessions for each data transmission source.

3. The control apparatus according to claim 2, wherein the traffic analysis part counts the number of communication sessions for each domain of a data transmission source.

4. The control apparatus according to claim 2, wherein the traffic analysis part determines whether or not the network is in the off-peak state, and the transmission management part holds the communication traffic and causes the transmission part to restrain execution of the transmission processing until the traffic analysis part determines that the network becomes the off-peak state, when the number of communication sessions exceeds the session number threshold.

5. The control apparatus according to claim 1, wherein the traffic analysis part counts the number of communication sessions for each domain of a data transmission source.

6. The control apparatus according to claim 5, wherein the traffic analysis part determines whether or not the network is in the off-peak state, and the transmission management part holds the communication traffic and causes the transmission part to restrain execution of the transmission processing until the traffic analysis part determines that the network becomes the off-peak state, when the number of communication sessions exceeds the session number threshold.

7. The control apparatus according to claim 1, wherein the traffic analysis part determines whether or not the network is in the off-peak state, and the transmission management part holds the communication traffic and causes the transmission part to restrain execution of the transmission processing until the traffic analysis part determines that the network becomes the off-peak state, when the number of communication sessions exceeds the session number threshold.

8. A communication control method, comprising:

receiving communication traffic in a predetermined network;

counting a number of communication sessions within a predetermined time period, included in the communication traffic;

holding the communication traffic and restraining a process of transmitting the communication traffic to a destination side until the network becomes an off-peak state, when the number of communication sessions exceeds a predetermined session number threshold;

storing information indicating a data transmission source and the session number threshold in association with each other;

acquiring the session number threshold corresponding to the data transmission source;

holding the communication traffic and restraining execution of the transmission processing until the network becomes the off-peak state, when the number of communication sessions exceeds the acquired session number threshold;

storing information indicating an expected off-peak time zone;

determining that the network is in the off-peak state when start time of the expected off-peak time zone is exceeded;

holding the communication traffic and restraining execution of the transmission processing until the start time of the expected off-peak time zone is exceeded, when the number of communication sessions exceeds the session number threshold;

storing information indicating the expected off-peak time zone and information regarding to a communication usage band range in association with each other; and executing the transmission processing at the expected off-peak time zone, estimating an expected unused time zone based on the expected off-peak time zone and the information regarding the communication usage band range, interrupting the transmission processing when the expected unused band range is used by exceeding a predetermined size at the expected off-peak time zone, and restarting execution of the transmission processing at a next expected off-peak time zone.

9. The communication control method according to claim 8, wherein
said counting a number of communication sessions within a predetermined time period, included in the communication traffic, is performed by counting the number of communication sessions for each data transmission source.

10. The communication control method according to claim 8, wherein
said counting a number of communication sessions within a predetermined time period, included in the communication traffic, is performed by counting the number of communication sessions for each domain of a data transmission source.

11. The communication control method according to claim 8, wherein the method further comprises:
determining whether or not the network is in the off-peak state, and
holding the communication traffic and restraining execution of the transmission processing until the traffic analysis part determines that the network becomes the off-peak state, when the number of communication sessions exceeds the session number threshold.

12. A non-transient computer-readable storage medium storing a program for causing a computer configured to control a control apparatus to execute processes, the processes comprising:
a process of receiving communication traffic in a predetermined network;
a process of counting a number of communication sessions within a predetermined time period, included in the communication traffic;
a process of holding the communication traffic and restraining a process of transmitting the communication traffic to a destination side until the network becomes an off-peak state, when the number of communication sessions exceeds a predetermine session number threshold;
a process of storing information indicating a data transmission source and the session number threshold in association with each other;
a process of acquiring the session number threshold corresponding to the data transmission source;
a process of holding the communication traffic and restraining execution of the transmission processing until the network becomes the off-peak state, when the number of communication sessions exceeds the acquired session number threshold;
a process of storing information indicating an expected off-peak time zone;
a process of determining that the network is in the off-peak state when start time of the expected off-peak time zone is exceeded;
a process of holding the communication traffic and restraining execution of the transmission processing until the start time of the expected off-peak time zone is exceeded, when the number of communication sessions exceeds the session number threshold;
a process of storing information indicating the expected off-peak time zone and information regarding to a communication usage band range in association with each other; and
a process of executing the transmission processing at the expected off-peak time zone, estimating an expected unused time zone based on the expected off-peak time zone and the information regarding the communication usage band range, interrupting the transmission processing when the expected unused band range is used by exceeding a predetermined size at the expected off-peak time zone, and restarting execution of the transmission processing at a next expected off-peak time zone.

* * * * *